United States Patent [19]
Griffin, III et al.

[11] Patent Number: 5,151,938
[45] Date of Patent: Sep. 29, 1992

[54] SECURITY ENHANCEMENT IN A DATA PROCESSOR THROUGH USE OF DYNAMIC PARAMETER AUTHENTICATION

[75] Inventors: Roy A. Griffin, III, Oceanside; James N. Esserman, San Diego; Steven E. Anderson, La Jolla, all of Calif.

[73] Assignee: General Instrument Corporation, Chicago, Ill.

[21] Appl. No.: 493,006

[22] Filed: Mar. 13, 1990

[51] Int. Cl.⁵ .............................................. H04L 9/00
[52] U.S. Cl. ....................................... 380/43; 380/3; 380/25
[58] Field of Search .................. 380/43, 3, 4, 23, 25; 364/200

[56] References Cited
U.S. PATENT DOCUMENTS

| | | | |
|---|---|---|---|
| 4,455,602 | 6/1984 | Baxter, III et al. | 364/200 |
| 4,613,901 | 9/1986 | Gilhousen et al. | 358/122 |
| 4,712,238 | 12/1987 | Gilhousen et al. | 380/20 |
| 4,864,615 | 9/1989 | Bennett et al. | 380/21 |

Primary Examiner—Thomas H. Tarcza
Assistant Examiner—David Cain
Attorney, Agent, or Firm—Edward W. Callan

[57] ABSTRACT

A descrambler for descrambling scrambled information signals through use of a predetermined decryption key. The processing means are adapted for processing data in accordance with a number of different data processing routines to descramble said scrambled information signals, including a routine for descrambling said scrambled information signals that utilizes said predetermined decryption key, and a routine for generating said predetermined decryption key. The processing means includes means for responding to an instruction for generating said predetermined decryption key by processing a first signal provided by the processing means with a second signal to generate said predetermined decryption key; and means for providing at least a portion of said second signal for processing with said first signal by retrieving a portion of said stored data from a portion of said memory means identified by a dynamic pointer contained in said instruction for generating said decryption key, with said retrieved data being data that is also used in a said data processing routine other than said routine for generating said predetermined decryption key.

23 Claims, 2 Drawing Sheets

SECURITY ENHANCEMENT IN A DATA PROCESSOR THROUGH USE OF DYNAMIC PARAMETER AUTHENTICATION

BACKGROUND OF THE INVENTION

The present invention generally pertains to secure data processing systems and is particularly directed to enhancing the security of a given data processing routine in which an essential predetermined signal is utilized.

More specifically, it is desired to enhance the security of a data processing routine in which the essential predetermined signal is a decryption key that is used for descrambling scrambled information signals.

Examples of data processing systems that utilize a decryption key for descrambling scrambled information signals are described in U.S. Pat. Nos. 4,613,901 to Klein S. Gilhousen, Charles F. Newby, Jr. and Karl E. Moerder; 4,712,238 to Klein S. Gilhousen, Michael V. Harding, Jerrold A. Heller and Robert D. Blakeney, II; and 4,864,615 to Christopher J. Bennett.

SUMMARY OF THE INVENTION

The present invention provides a data processing system, including processing means for processing data in accordance with a number of different data processing routines; and memory means for storing data for use in said data processing routines; wherein the processing means includes means for responding to an instruction for generating a given signal by processing a first signal with a second signal to generate said given signal; and means for providing at least a portion of said second signal for processing with said first signal by retrieving a portion of said stored data from a portion of said memory means identified by a dynamic pointer contained in said instruction for generating said predetermined signal; wherein the given signal has a predetermined content that is essential to at least one of said data processing routines.

Security of the data processing routines executed by the data processing system of the present invention is further enhanced by including in said retrieved data dynamic data that is also used in a said data processing routine other than said routine for generating said predetermined signal.

The term "dynamic" is used to indicate a changeable parameter. A dynamic pointer is a pointer that may be changed from time to time. Dynamic data is data that may change with time and/or with execution of the data processing routines.

Utilization of these dynamic parameters makes unauthorized descrambling of scrambled information signals by a pirate more difficult since the dynamic parameters have to be authenticated to enable descrambling.

In a preferred embodiment, the data processing system of the present invention is utilized as a descrambler for descrambling scrambled information signals through use of a predetermined decryption key, wherein the processing means are adapted for processing data in accordance with a number of different data processing routines to descramble said scrambled information signals, including a routine for descrambling said scrambled information signals that utilizes said predetermined decryption key, and a routine for generating said predetermined decryption key; and wherein the processing means includes means for responding to an instruction for generating said predetermined decryption key by processing a first signal provided by the processing means with a second signal to generate said predetermined decryption key; and means for providing at least a portion of said second signal for processing with said first signal by retrieving a portion of said stored data from a portion of said memory means identified by said dynamic pointer contained in said instruction for generating said decryption key.

In another aspect, the present invention provides a communication system including a descrambler as described above in combination with a scrambler for scrambling information signals. The scrambler includes processing means for processing data in accordance with a number of different data processing routines, including a routine for scrambling said information signals and a routine for encrypting a predetermined decryption key that is required for descrambling said scrambled information signals; and memory means for storing data for use in said data processing routines; and wherein the scrambler processing means includes for responding to an instruction to encrypt said predetermined decryption key, by processing said predetermined decryption key with a second signal to encrypt said predetermined decryption key; and means for providing said second signal.

Additional features of the present invention are described in relation to the description of the preferred embodiment.

DESCRIPTION OF THE PREFERRED EMBODIMENT

Figure 1:
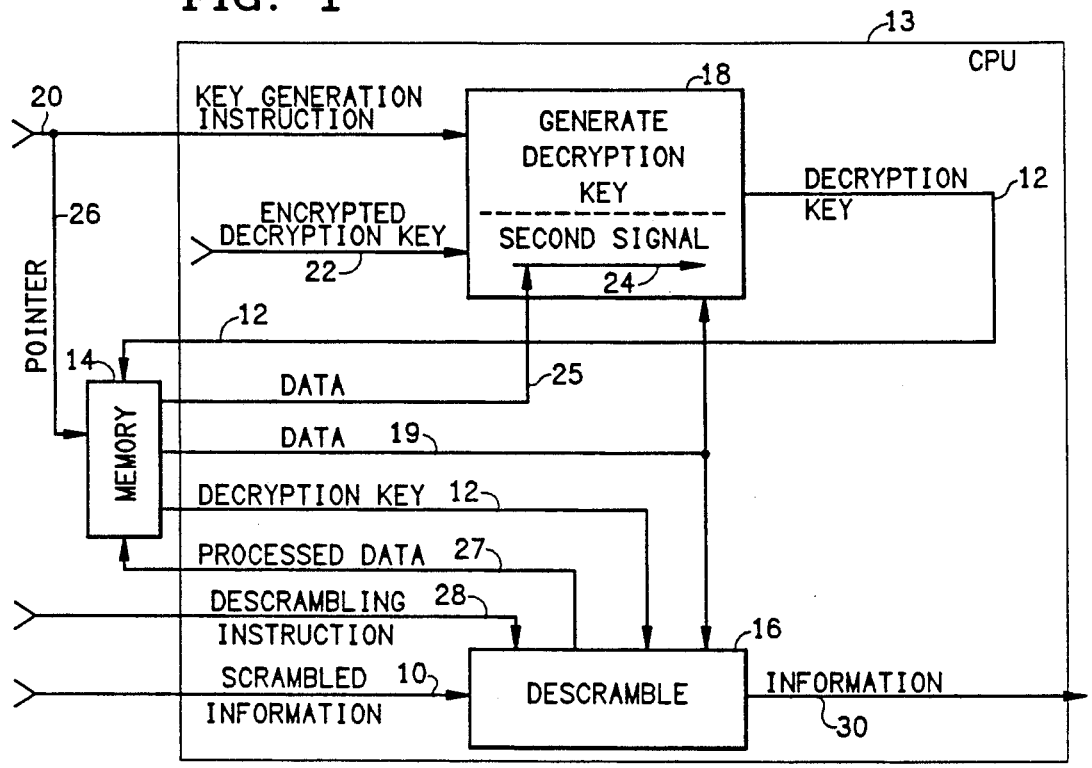
FIG. 1 is a block diagram of a preferred embodiment of the system of the data processing system of the present invention embodied as a descrambler.

A preferred embodiment of a data processing system of the present invention is embodied as a descrambler in a microprocessor, as shown in FIG. 1. The descrambler descrambles scrambled information signals 10 through use of a predetermined decryption key 12. The microprocessor includes a central processing unit (CPU) 13 and a memory 14. The memory 14 may include a random access memory (RAM) and a read only memory (ROM). The CPU 13 is adapted for processing data in accordance with a number of different data processing routines, including a routine 16 for descrambling scrambled information signals that utilizes a predetermined decryption key 12, and a routine 18 for generating the predetermined decryption key 12. The CPU 13 also processes data in accordance with other routines (not shown) incident to the descrambling of information signals in accordance with the various data processing steps described in the aforementioned U.S. Pat. Nos. 4,613,901; 4,712,238 and 4,864,615. The predetermined decryption key may be any of the decryption keys described in these patents, including intermediate keys and signals created at different stages during the generation of such decryption keys.

The memory 14 stores data 19 that is used in the data processing routines 16, 18.

The CPU 13 responds to an instruction 20 for generating the predetermined decryption key by executing the routine 18. In accordance with the routine 18, a first signal 22, such as an encrypted decryption key, provided by the CPU 13 is processed with a second signal 24 to generate the predetermined decryption key 12.

At least a portion 25 of the second signal 24 is provided by retrieving a portion of the stored data 19 from a portion of the memory 14 that is identified by a dynamic pointer 26 contained in the instruction 20 for generating the predetermined decryption key 12. The retrieved second-signal data 25 preferably includes dynamic data that is also used in a data processing routine other than the routine 18 for generating the predetermined decryption key 12.

The decryption key generation routine 18 of the present invention may be utilized in generating multiple predetermined signals, such as decryption keys, and in generating an intermediate key or signal that is essential to the generation of the ultimate predetermined signal, such as the decryption key 12.

The data which is retrieved from the memory 14 as the second-signal data 25 may be data that is dynamically stored in the memory 14 as such data is being processed by the CPU 13 in the various data processing routines executed by the CPU 13, such as data 27 which is processed and stored during the descrambling routine 16. Alternatively, the data which is retrieved from the memory 14 as the second-signal data 25 may be data that is otherwise stored in the memory 14 for processing by the CPU 13.

The predetermined decryption key 12 ultimately generated in accordance with the routine 18 is stored in the memory 14.

The CPU 13 responds to an instruction 28 for descrambling the scrambled information signal 10 by executing the routine 16. In accordance with the routine 16, the predetermined decryption key 12 is retrieved from the memory 14 and utilized in descrambling the scrambled information signal 10 to produce a descrambled information signal 30.

Figure 2:
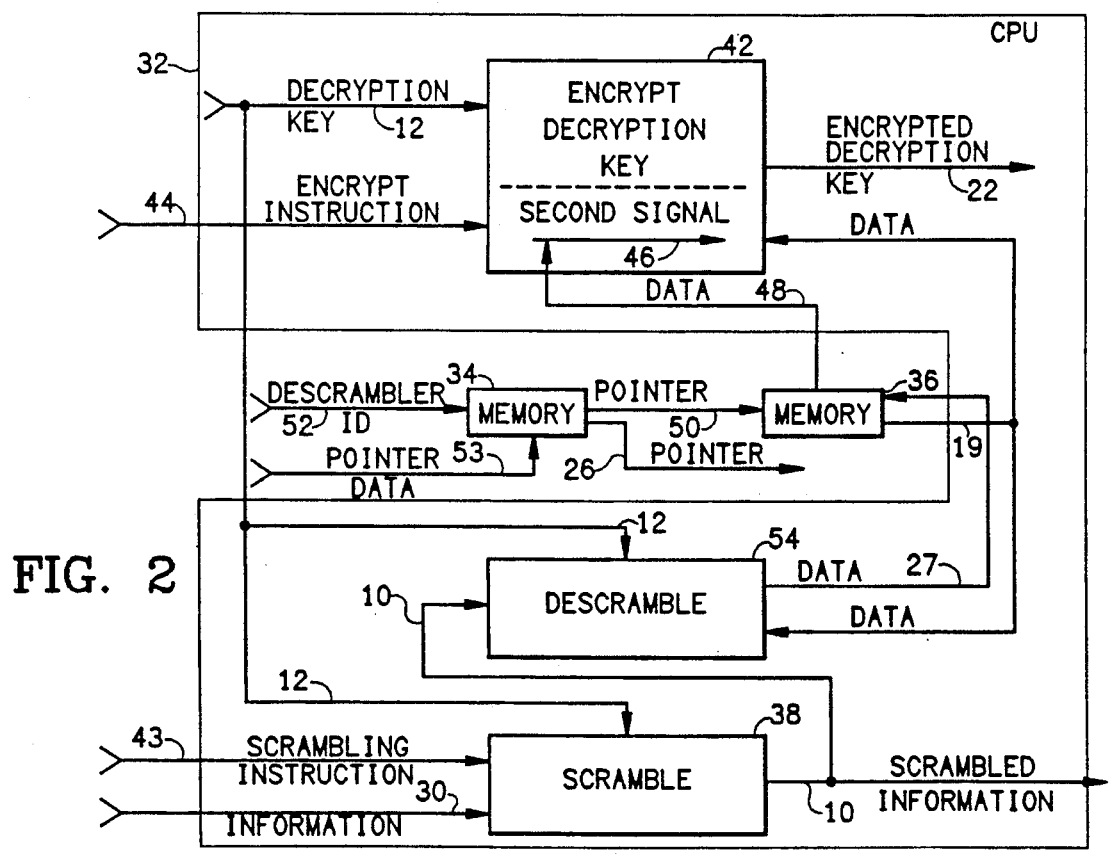
FIG. 2 is a block diagram of a preferred embodiment of a scrambler that is combined with the descrambler of FIG. 1 in a communication system.

The descrambler of FIG. 1 is used in a communication system that further includes a scrambler, such as shown in FIG. 2, and a plurality of such descramblers. The scrambler of FIG. 2 is embodied in a data processing system that includes a CPU 32, a first memory 34 and a second memory 36. The memories 34 and 36 may include RAM and/or ROM.

The CPU 32 processes data in accordance with a number of different data processing routines, including a routine 38 for scrambling said information signals 30 and a routine 42 for encrypting a predetermined decryption key 12 that is required for descrambling the scrambled information signals 10. The CPU 32 also processes data in accordance with other routines (not shown) incident to the scrambling of information signals in accordance with the various data processing steps described in the aforementioned U.S. Pat. Nos. 4,613,901; 4,712,238 and 4,864,615.

The CPU 32 responds to an instruction 43 for scrambling the information signal 30 by executing the routine 38. In accordance with the routine 38, the predetermined decryption key 12 is utilized in scrambling the information signal 30 to produce the scrambled information signal 10.

The CPU 32 responds to an instruction 44 to encrypt the predetermined decryption key 12 by executing the routine 42. In accordance with the routine 42, the predetermined decryption key 12 is processed with a second signal 46 to encrypt the predetermined decryption key and thereby produce an encrypted decryption key 22. The second signal 46 is provided from the memory 36. At least a portion of the second signal 46 is provided by retrieving a portion 48 of the data stored in the memory 14 that is identified by a dynamic pointer 50.

The encrypted decryption key 22 is transmitted to the descramblers together with the scrambled information signal 10.

In the preferred embodiment of the communication system, the predetermined decryption key 12 is encrypted differently for different groups of descramblers. Accordingly, different second-signal components 48 are stored in the memory 36 for differently encrypting the predetermined decryption key 12 for the different groups of descramblers. The different second-signal components 48 are selected from the memory 36 in response to the pointer 50 for use in encrypting the predetermined decryption key 12 to provide different encrypted decryption keys 22 for transmission to the different groups of descramblers. The pointer 50 thus serves as a selection-control signal that is different for each of the different groups of descramblers.

The memory 34 provides different pointers 50 corresponding to the different groups of descramblers in response to a descrambler identification (ID) signal 52 and a pointer data signal 53. The pointer data signal 53 is combined with the descrambler ID signal 52 to indicate the portions of the memory 34 from which the pointers 50 and 26 are to be provided so that the pointers 50 and 26 related to a given descrambler can be changed to access the second-signal components 48 (and components 25 in the descrambler of FIG. 1) from different portions of the memory 36 (and memory 14 in the descrambler of FIG. 1).

The pointers 26 for the different descramblers are also transmitted to the descramblers, where they are included in the key generation instruction 20. The transmitted pointers 26 may or may not be identical to the pointers 50.

In order for the pointers 26 to be identical to the pointers 50 the CPU 32 of the scrambler simulates the operation of a descrambler of each of the different groups of descramblers in order to produce and dynamically store in the memory 36 of the scrambler the same second-signal data as is dynamically stored in the memory 14 of a descrambler in each of the different groups of descramblers. Accordingly the scrambler executes a descrambling routine 54 so as to process the scrambled information signal 10 in the same manner as the scrambled information signal 10 is processed in the descrambler and thereby provide the same data 27 for dynamic storage in the memory 36 and retrieval in response to the pointer 50 as is dynamically stored in the memory 14 of the descrambler and retrieved as second-signal data 25 in response to the pointer 26.

The stored data 19 used in executing the routines 42 and 54 are provided from the memory 36 in the same manner as said data 19 is provided from the memory 14 in the descrambler for use in executing the routines 16 and 18.

The data which is retreived from the memory 36 as the second-signal data 48 may be data that is dynamically stored in the memory 36 as such data is being processed by the CPU 32 in the various data processing routines executed by the CPU 32, such as data 27 which is processed and stored during the descrambling routine 54. Alternatively, the data which is retrieved from the memory 32 as the second-signal data 48 may be data that is otherwise stored in the memory 36 for processing by the CPU 32.

In an alternative embodiment (not shown), the second signal 46 is provided independently of the memory 36 and/or the pointers 50.

Figure 3A:
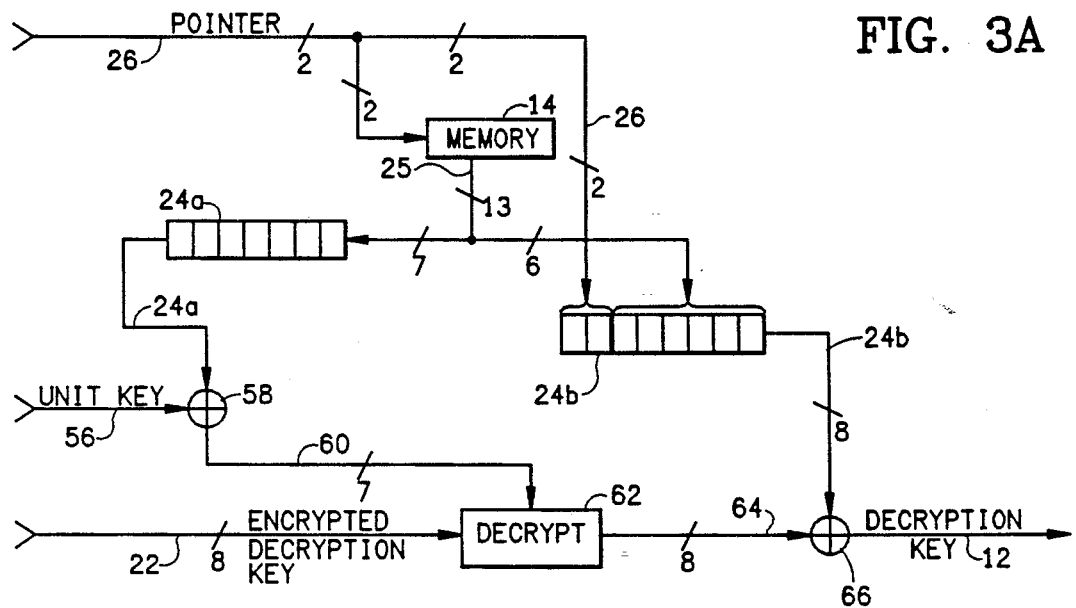
FIG. 3A is a block diagram of a preferred embodiment of a portion of the descrambler of FIG. 1 utilized for decrypting an encrypted decryption key.
Figure 3B:
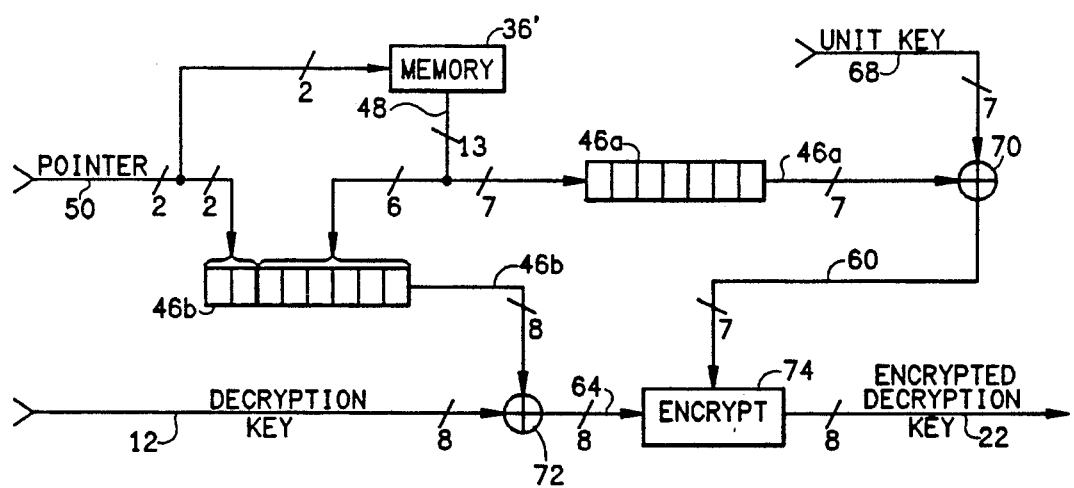
FIG. 3B is a block diagram of a preferred embodiment of a portion of the scrambler of FIG. 2 utilized for encrypting the decryption key that is decrypted in the portion of the descrambler shown in FIG. 3A.

In one preferred embodiment, as shown in FIGS. 3A and 3B, second-signal data retrieved from the respective memories of the scrambler and the descrambler is divided and used in separate subroutines of the respective encryption and decryption routines.

Referring to FIG. 3A, the CPU of the descrambler causes thirteen bytes of second signal data 25 to be retrieved from the memory 14 in response to a two-byte pointer 26. A first part of the second signal 24a consisting of seven bytes of the retrieved second-signal data 25 is exclusive-ORed (XORed) with a seven-byte unit key 56 in accordance with a subroutine 58 to provide a first intermediate signal 60 of seven bytes. The seven-byte unit key 56 is provided within the descrambler CPU in the manner described with reference to FIG. 8 in the aforementioned U.S. Pat. No. 4,864,615 for providing the unit key identified by reference numeral 148 in said patent.

The CPU executes a decryption subroutine 62 in which the predetermined decryption key 22 (eight bytes) is processed with the seven-byte first intermediate signal 60 to provide a second intermediate signal 64 of eight bytes. Preferably the subroutine 62 is in accordance with the Data Encryption Standard (DES) algorithm.

A second part of the second signal 24b consisting of six bytes of the retrieved second-signal data 25 and the two-byte pointer 26 is XORed with the eight-byte second intermediate key 64 in accordance with a subroutine 66 to provide the decryption key 12.

Referring to FIG. 3B, the CPU of the scrambler causes thirteen bytes of second signal data 48 to be retrieved from the memory 36' in response to a two-byte pointer 50. The thirteen bytes of second-signal data 48 are identical to the thirteen bytes of second-signal data 25.

A first part of the second signal 46a consisting of seven bytes of the retrieved second-signal data 48 is exclusive-ORed (XORed) with a seven-byte unit key 68 in accordance with a subroutine 70 to provide the first intermediate signal 60 of seven bytes. The unit key 68 is identical to the unit key 56 provided within the descrambler CPU.

A second part of the second signal 46b consisting of six bytes of the retrieved second-signal data 48 and the two-byte pointer 50 is XORed with the eight-byte decryption key 12 in accordance with a subroutine 72 to provide the second intermediate key 64.

The scrambler CPU executes an encryption subroutine 74 in which the second intermediate key 64 (eight bytes) is processed with the seven-byte first intermediate signal 60 to provide the encrypted decryption key 22. Preferably the subroutine 74 is in accordance with the Data Encryption Standard (DES) algorithm.

We claim:

1. A data processing system, comprising
processing means for processing data in accordance with a number of different data processing routines; and
memory means for storing data for use in said data processing routines;
wherein the processing means includes
means for responding to an instruction for generating a given signal by processing a first signal with a second signal to generate said given signal; and
means for providing at least a portion of said second signal for processing with said first signal by retrieving a portion of said stored data from a portion of said memory means identified by a dynamic pointer contained in said instruction for generating said predetermined signal;
wherein the given signal has a predetermined content that is essential to at least one of said data processing routines.

2. A data processing system according to claim 1, wherein said retrieved data includes dynamic data that is also used in a said data processing routine other than said routine for generating said given signal.

3. A data processing system according to claim 1, wherein said second signal includes said pointer and said retrieved data.

4. A data processing system according to claim 3, wherein said retrieved data includes dynamic data that is also used in a said data processing routine other than said routine for generating said given signal.

5. A data processing system embodied as a descrambler for descrambling scrambled information signals through use of a predetermined decryption key, comprising
processing means for processing data in accordance with a number of different data processing routines, including a routine for descrambling said scrambled information signals that utilizes said predetermined decryption key, and a routine for generating said predetermined decryption key; and
memory means for storing data for use in said data processing routines;
wherein the processing means includes
means for responding to an instruction for generating said predetermined decryption key by processing a first signal provided by the processing means with a second signal to generate said predetermined decryption key; and
means for providing at least a portion of said second signal for processing with said first signal by retrieving a portion of said stored data from a portion of said memory means identified by a dynamic pointer contained in said instruction for generating said decryption key.

6. A data processing system according to claim 5, wherein said retrieved data includes dynamic data that is also used in a said data processing routine other than said routine for generating said predetermined decryption key.

7. A system according to claim 5, wherein the first signal is an encrypted decryption key; and
wherein the processing means are adapted to generate said predetermined decryption key by executing the following routines:
(a) providing a third signal;
(b) processing said third signal with a first part of said second signal that includes a first part of said retrieved second-signal data to provide a fourth signal;

(c) processing said encrypted decryption key with said fourth signal to provide a fifth signal; and (d) processing said fifth signal with a second part of said second signal that includes at least a second part of said retrieved second-signal data to provide said decryption key.

8. A data processing system according to claim 7, wherein said retrieved data includes dynamic data that is also used in a said data processing routine other than said routine for generating said predetermined signal.

9. A system according to claim 7, wherein routine (d) comprises processing said fifth signal with a second part of said second signal that includes both said pointer and at least a second part of said retrieved second-signal data to provide said decryption key.

10. A communication system, comprising
a scrambler for scrambling information signals, including
processing means for processing data in accordance with a number of different data processing routines, including a routine for scrambling said information signals and a routine for encrypting a predetermined decryption key that is required for descrambling said scrambled information signals;
wherein the scrambler processing means includes
means for responding to an instruction to encrypt said predetermined decryption key, by processing said predetermined decryption key with a second signal to encrypt said predetermined decryption key; and
means for providing said second signal; and
a descrambler for descrambling said scrambled information signals through use of said predetermined decryption key and a dynamic pointer, comprising
processing means for processing data in accordance with a number of different data processing routines, including a routine for descrambling said scrambled information signals that utilizes said predetermined decryption key, and a routine for decrypting said encrypted decryption key; and
memory means for storing data for use in said descrambler data processing routines;
wherein the descrambler processing means includes
means for responding to an instruction for generating said predetermined decryption key by processing said encrypted decryption key with said second signal to generate said predetermined decryption key; and
means for providing at least a portion of said second signal for said processing with said encrypted decryption key by retrieving a portion of said stored data from a portion of said descrambler memory means identified by a dynamic pointer contained in said instruction for generating said decryption key.

11. A communication system according to claim 10, wherein said retrieved data includes dynamic data that is also used in a said data processing routine other than said routine for generating said predetermined decryption key.

12. A communication system according to claim 10, wherein said descrambler includes means for dynamically storing as said second-signal data in said descrambler memory means data that is being processed by the descrambler processing means in said data processing routines executed by the descrambler processing means as said data is being processed; and
wherein said scrambler includes
means for processing said scrambled information signal in the same manner as said scrambled information signal is processed in the descrambler in order to provide said second-signal data; and
memory means for dynamically storing said second-signal data.

13. A communication system according to claim 12, wherein said scrambler processing means includes means for providing at least a portion of said second signal by retrieving said second signal data from a portion of said scrambler memory means identified by said pointer; and
wherein said descrambler memory means store said second-signal data in portions that are accessed in response to said pointer corresponding to the portions of the scrambler memory means from which said second-signal data is accessed in response to said pointer.

14. A communication system according to claim 10, wherein said scrambler processing means includes
memory means for storing said second-signal data.
means for providing at least a portion of said second signal by retrieving said second signal data from a portion of said scrambler memory means identified by said pointer; and
wherein said descrambler memory means store said second-signal data in portions that are accessed in response to said pointer corresponding to the portions of the scrambler memory means from which said second-signal data is accessed in response to said pointer.

15. A communication system according to claim 10, wherein the means for providing the second signal in the scrambler comprises
memory means for storing a number of different predetermined said second signal components; and
means for providing a selected said predetermined second signal by retrieving a selected predetermined said second signal component from said scrambler memory means in response to a selection-control signal.

16. A communication system according to claim 15, comprising a plurality of said descramblers;
wherein the scrambler processing means are adapted for providing different said selection-control signals for selecting different said predetermined second signal components for use in differently encrypting said decryption key for different descramblers.

17. A system according to claim 10, wherein said descrambler processing means are adapted to generate said predetermined decryption key by executing the following routines:
(a) providing a third signal;
(b) processing said third signal with a first part of said second signal that includes a first part of said retrieved second-signal data to provide a fourth signal;
(c) processing said encrypted decryption key with said fourth signal to provide a fifth signal; and
(d) processing said fifth signal with a second part of said second signal that includes at least a second part of said retrieved second-signal data to provide said decryption key.

18. A system according to claim 17, wherein routine (d) comprises processing said fifth signal with a second part of said second signal that includes both said pointer and at least a second part of said retrieved second-signal data to provide said decryption key.

19. A system according to claim 18, wherein said scrambler processing means are adapted to encrypt said predetermined decryption key by executing the following routines:
   (a) processing said decryption key with said second part of said second signal to provide said provide said fifth signal;
   (b) providing said third signal;
   (c) processing said third signal with said first part of said second signal to provide said fourth signal; and
   (d) processing said fifth signal with said fourth signal to provide said encrypted decryption key.

20. A system according to claim 17, wherein said scrambler processing means are adapted to encrypt said predetermined decryption key by executing the following routines:
   (a) processing said decryption key with said second part of said second signal to provide said provide said fifth signal;
   (b) providing said third signal;
   (c) processing said third signal with said first part of said second signal to provide said fourth signal; and
   (d) processing said fifth signal with said fourth signal to provide said encrypted decryption key.

21. A system according to claim 5, wherein the first signal is an encrypted decryption key; and
   wherein the processing means are adapted to generate said predetermined decryption key by executing the following routines:
   (a) providing a third signal;
   (b) processing said third signal with said retrieved second-signal data to provide a fourth signal; and
   (c) processing said encrypted decryption key with said fourth signal to provide said decryption key.

22. A system according to claim 11, wherein said descrambler processing means are adapted to generate said predetermined decryption key by executing the following routines:
   (a) providing a third signal;
   (b) processing said third signal with said retrieved second-signal data to provide a fourth signal; and
   (c) processing said encrypted decryption key with said fourth signal to provide said decryption key.

23. A system according to claim 22, wherein said scrambler processing means are adapted to encrypt said predetermined decryption key by executing the following routines:
   (a) providing said third signal;
   (b) processing said third signal with said retrieved second signal data to provide said fourth signal; and
   (c) processing said decryption key with said fourth signal to provide said encrypted decryption key.

* * * * *

UNITED STATES PATENT AND TRADEMARK OFFICE
CERTIFICATE OF CORRECTION

PATENT NO. : 5,151,938

DATED : September 29, 1992

INVENTOR(S) : Roy A. Griffin, III, Et Al.

It is certified that error appears in the above-identified patent and that said Letters Patent is hereby corrected as shown below:

Column 1, lines 37 and 38, change "predetermined" to --given--.

Column 2, line 20, after "includes", insert --means--.

Column 6, line 17, change "predetermined" to --given--.

Signed and Sealed this

Eleventh Day of January, 1994

Attest:

BRUCE LEHMAN

Attesting Officer

Commissioner of Patents and Trademarks